United States Patent [19]

Arima et al.

[11] 4,409,584

[45] Oct. 11, 1983

[54] INSTRUMENT PANEL SUPPORTING STRUCTURE

[75] Inventors: Sumitsugu Arima, Yokosuka; Harutoshi Tsujimura; Yukio Fukunaga, both of Yokohama, all of Japan

[73] Assignee: Nissan Motor Company, Limited, Kanagawa, Japan

[21] Appl. No.: 288,779

[22] Filed: Jul. 31, 1981

[30] Foreign Application Priority Data

Aug. 13, 1980 [JP] Japan .......................... 55-114597[U]

[51] Int. Cl.$^3$ ........................ G08G 1/00; G05G 11/00
[52] U.S. Cl. ................................. 340/22; 74/484 R; 74/552; 180/78
[58] Field of Search ............... 340/22; 74/552, 484 R, 74/492, 496, 497; 180/78

[56] References Cited

U.S. PATENT DOCUMENTS 1,795,566 3/1931 MacComb ............................. 180/78
1,944,905 1/1934 Rowell .................................. 180/78

FOREIGN PATENT DOCUMENTS 9264 of 0000 European Pat. Off. .
1427439 of 0000 United Kingdom ................. 340/22
2068859 of 0000 United Kingdom ................. 340/22
WO80/00683 4/1980 PCT Int'l App. .................... 340/22

Primary Examiner—James J. Groody

[57] ABSTRACT

An instrument panel supporting structure having a switch support member provided with manually operated electric switches and positioned inside the rim portion of a steering wheel of a steerable vehicle, wherein the switch support member having recesses therein is rotatably mounted on the steering shaft and a slider support member having a plurality of sliders slidably supported thereon is secured to the steering column tube and wherein the sliders are urged to protrude into the recesses, respectively, in the switch support member so as to provide engagement between the switches and slider support members and to prevent the switch support member from rotation with respect to the slider support member. When the steering wheel is turned and a radial spoke portion of the steering wheel is brought into engagement with any one of the sliders, the particular slider is forced by the spoke portion to retract away from the recess in the switch support member and permits the spoke portion to move past the slider.

6 Claims, 6 Drawing Figures

INSTRUMENT PANEL SUPPORTING STRUCTURE

FIELD OF THE INVENTION

The present invention relates to an instrument panel supporting structure for use in a steering mechanism of the steerable vehicle and, more particularly, to an instrument panel supporting structure arranged with an inflatable safety bag and/or manually operated electric switches positioned inside the rim portion of the steering wheel of the mechanism.

SUMMARY OF THE INVENTION

In accordance with the present invention, there is provided a supporting structure of a steerable vehicle including a body structure having a fore-and-aft direction, comprising a hollow steering column tube which is held stationary with respect to the vehicle body structure, a steering shaft axially extending in and through the steering column tube and having a rear end portion axially projecting from the steering column tube, the steering shaft having a center axis therethrough and being rotatable about the center axis with respect to the steering column tube, a steering wheel which is rotatable with the steering shaft about the center axis of the steering shaft and which has at least one spoke portion extending substantially radially away from the center axis of the steering shaft, a first support member which is mounted on the rear end portion of the steering shaft and which is rotatable about the center axis of the steering shaft with respect to both of the steering column tube and the steering shaft, the first support member having a plurality of recesses which are arranged in a circumferential direction about the center axis of the steering shaft and which are open in directions parallel with the center axis of the steering shaft, a second support member secured to the steering column tube and having a plurality of cavities which are arranged in a circumferential direction about the center axis of the steering shaft and which are open toward and in alignment with the recesses, respectively, in the first support member, the spoke portion of the steering wheel partly intervening between the first support member and the second support member so as to intervene any one of the recesses in the first support member and the aligned one of the cavities in the second support member when the steering wheel assumes a certain angular position about the center axis of the steering shaft with respect to the steering column tube, a plurality of sliders which are respectively movable through the cavities in the second support member toward and away from the recesses in the first support member, each of the sliders having a tapered end portion having a pair of side faces slanting toward each other with respect to a plane which passes through the center axis of the steering shaft, and biasing means urging each of the sliders to project into each of the recesses in the first support member so as to have the tapered end portion of each slider received in each of the recesses.

The sliders included in the instrument panel supporting structure according to the present invention may consist of a first group of sliders each having its tapered end portion constituted by an electric contact element and a second group of sliders each of which is devoid of an electric contact element. In this instance, the recesses in the first support member consist of a first group of recesses each having an electric contact element embedded therein and formed with a recess having received therein the contact element of each of the first group of sliders and a second group of recesses each of the which is devoid of an electric contact element, each of the contact elements of the first group of sliders being urged to establish electrical connection to each of the contact elements in the first group of recesses in the first support member by the above mentioned biasing means.

BRIEF DESCRIPTION OF THE DRAWINGS

The drawbacks of a prior-art steering mechanism and the features and advantages of a steering mechanism according to the present invention will be more clearly understood from the following description taken in conjunction with the accompanying drawings in which.

BACKGROUND OF THE INVENTION

One of the recent trends in designing automotive vehicles is to equip an automotive vehicle with various extra instruments and accessories. Typical examples of these instruments and accessories are audio players and drive computers (which are the instruments to display the fuel consumption rates and the scheduled times of arrival at the destinations of travel).

Provision of the additional instruments and accessories has enhanced the centralization of the fitting and wiring arrangements on the instrument panel of an automotive vehicle. Situations presently encountered as a consequence are such that there are practically no spaces available underneath the instrument panel, making more strict the design considerations for the layout of the additional instruments and accessories.

Attempts have therefore been made to install some extra instruments and accessories on a support structure provided inside the rim portion of the steering wheel structure so as to ease the space requirement for the setup of the instruments and accessories.

Figure 1:
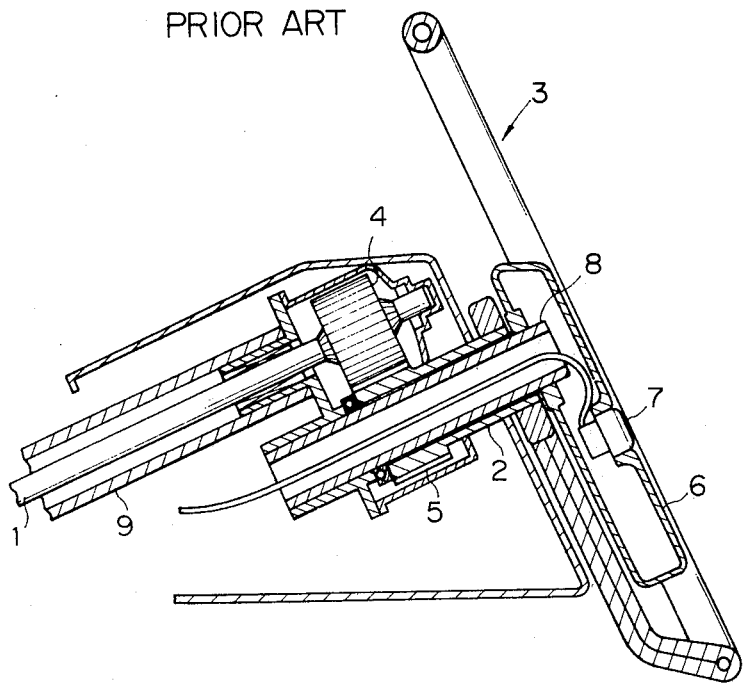
FIG. 1 is a longitudinal sectional view showing a representative example of a prior-art instrument panel supporting structure of the general nature to which the present invention appertains.

Referring to FIG. 1 of the drawings, a known instrument panel supporting structure to realize such a scheme is shown comprising a steering main shaft 1 connected at its front end to the steering gear mechanism (not shown) and a hollow steering counter shaft 2 arranged in parallel with the main shaft and supporting the steering wheel 3. The main and counter shafts 1 and 2 are engaged by each other by means of spur gears 4 and 5 respectively mounted on the shafts 1 and 2 so that a turning load applied to the steering wheel 3 is transmitted to the steering main shaft 1 through the counter shaft 2 and the gears 4 and 5 which are in mesh with each other. The support structure 6 having mounted thereon the switch unit 7 of a warning horn system is supported by a hollow cylindrical post member 8 secured to a steering column tube 9 fixed with respect to the body structure (not shown) of the vehicle. The counter shaft 2 carrying the steering wheel 3 is rotatably mounted on such a cylindrical post member 8 and is permitted to turn with the steering wheel 3 independently of the switch support structure 6. Thus, the switch support structure 6 is maintained at a standstill irrespective of the turning motions of the steering wheel 3.

Drawbacks are, however, concomitant with a prior-art steering mechanism of this nature principally due to the intricate construction of the mechanism using the two parallel shafts and the gears respectively mounted on the shafts.

The present invention contemplates provision of a steering mechanism which is free from such drawbacks but which is nevertheless capable of achieving the advantage of the known steering mechanism.

DESCRIPTION OF THE EMBODIMENTS

Description will be hereinafter made in regard to the embodiment of the instrument panel supporting structure according to the present invention.

Figure 2:
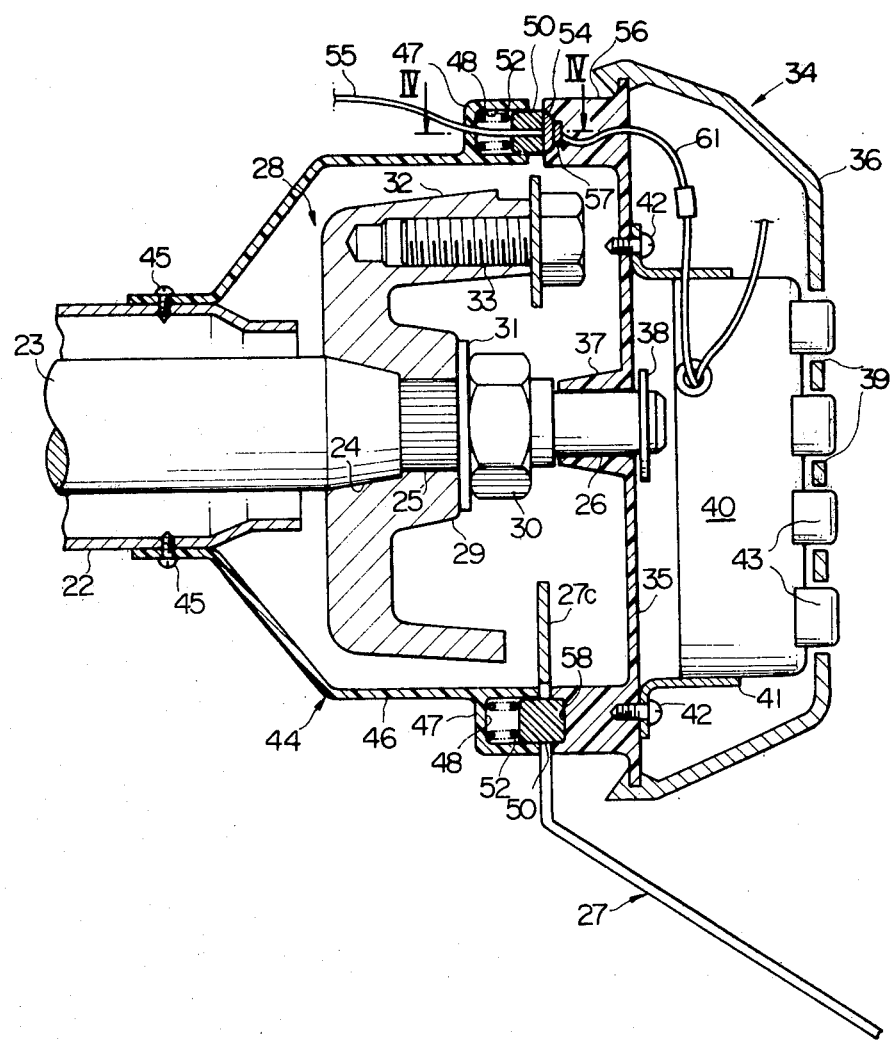
FIG. 2 is a fragmentary longitudinal sectional view showing an embodiment of an instrument panel supporting structure according to the present invention.

Referring to FIGS. 2 to 5, first particularly to FIG. 2 thereof, an instrument panel supporting structure embodying the present invention comprises an elongated, hollow steering column tube 22 and an elongated steering shaft 23 axially extending in and coaxial with the steering mechanism tube 22. The instrument panel supporting structure herein shown is assumed, by way of example, to form part of a steering system of an automotive vehicle and, thus, the steering column tube 22 is securely connected to the body structure (not shown) of the automotive vehicle. Likewise, the steering shaft 23 is connected to a suitable gear mechanism (not shown) of the steering system. The gear mechanism in turn is connected through a suitable steering linkage to the front road wheels of the vehicle, though not shown in the drawings. The steering shaft 23 has suitable axial portions journalled in bearings (not shown) supported in the steering column tube 22 and is thus rotatable about the center axis thereof in the steering column tube 22 and accordingly with the respect to the body structure of the vehicle.

The steering shaft 23 has a rear axial extension having a rearwardly tapered axial portion 24 axially projecting outwardly from the rear end of the steering column tube 22, and a serrated axial portion 25 extending rearwardly from the tapered axial portion 24. The extension of the steering shaft 23 further has a threaded axial portion (not visible in FIG. 2) axially extending rearwardly from the serrated axial portion 25 and a reduced rear end portion 26 further extending rearwardly from the threaded axial portion.

Figure 3:
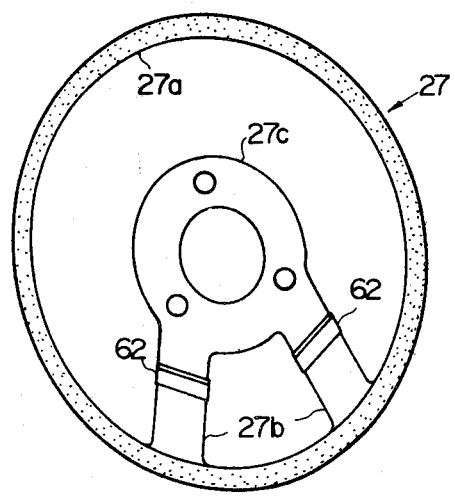
FIG. 3 is a perspective view showing a steering wheel which forms part of the steering mechanism embodying the present invention.

The instrument panel supporting structure embodying the present invention further comprises a steering wheel 27 as is customary. In FIG. 3 of the drawings, the steering wheel 27 is shown having a circular rim portion 27a having a center axis aligned with the center axis of the steering shaft 23 (FIG. 2) and a pair of spoke portions 27b radially extending inwardly from the rim portion 27a and angularly spaced apart from each other about the center axis of the rim portion 27a. The steering wheel 27 further has an annular central portion 27c into which the spoke portion 27b radially merge inwardly, the central portion 27c being shown formed with a plurality of holes.

Turning back to FIG. 2 of the drawings, the steering wheel 27 thus shaped is secured to the steering shaft 23 by means of a hollow, generally drum-shaped hub member 28 which is coaxial with the rim portion 27a of the steering wheel 27. The hub member 28 has a central boss portion 29 formed with an axial bore consisting of a counter-tapered portion and an internally serrated portion which are formed conformingly to the tapered and serrated axial portions 24 and 25, respectively, of the steering shaft 23. The hub member 28 is thus fitted to and coaxially rotatable with the steering shaft 23 with the tapered and serrated axial portions 24 and 25 of the shaft 23 fitted in the counter-tapered and internally serrated portions, respectively, of the axial bore in the hub member 28. The threaded axial portion and the reduced rear end portion 26 of the steering shaft 23 axially project rearwardly from the bore in the hub member 28. The hub member 28 is secured to the steering shaft 23 by means of a clamping nut 30 which is screwed on the threaded axial portion of the steering shaft 23 with a washer 31 interposed between the nut 30 and the boss portion 29 of the hub member 28.

The hub member 28 further has a generally cylindrical side wall portion 32 to which the annular central portion 27c of the steering wheel 27 is securely attached by means of bolts passed through the previously mentioned holes formed in the central portion 27c, only one of the bolts being shown in the drawings and designated by reference numeral 33 in FIG. 2. The steering wheel 27 is in this fashion securely connected to the steering shaft 23 by means of the hub member 28 and is thus rotatable with the steering shaft 23 about the center axis of the shaft 23 with respect to the steering column tube 22 and accordingly to the body structure of the vehicle. The reduced rear end portion 26 of the steering shaft 23 extends rearwardly through the opening in the annular central portion 27c of the steering wheel 27.

The instrument panel supporting structure embodying the present invention further comprises an accessory switch support structure 34 which is largely composed of a switch support member 35 and a finisher or rear end housing member 36. The switch support member 35 has a central boss portion 37 formed with an axial bore and is rotatably mounted on the reduced rear end portion 26 of the steering shaft 23 through the axial bore in the boss portion 37. The reduced rear end portion 26 of the steering shaft 23 slightly projects rearwardly from the axial bore in the boss portion 37 and has a ring-shaped retainer element 38 fitted thereon so as to restrict the axial movement of the support member 35 on the end portion 26 of the steering shaft 23. On the other hand, the rear end housing member 36 has a side wall portion securely fitted to an outer marginal portion of the switch support member 35 and a rear end wall portion rearwardly spaced apart from the support member 35 and formed with a plurality of openings 39.

An electric switch assembly 40 is housed within the space formed between the switch support member 35 and the rear end wall portion of the housing member 36. The switch assembly 40 is mounted on the support member 35 by means of a bracket member 41 secured to the support member 35 by suitable fastening elements such as screws 42 as shown. The switch assembly 40 has a plurality of switching pushbuttons 43 projecting rearwardly through the openings 39 in the rear end wall portion of the housing member 36. Thus, each of the pushbottons 43 can be manually depressed from the outside of the accessory switch support structure 34.

The instrument panel supporting structure embodying the present invention further comprises a generally bell-mouthed slider support member 44 having a reduced cylindrical front end portion securely connected to the steering column tube 22 by suitable fastening means such as screws 45 as shown. The slider support member 44 further has a cylindrical rear wall portion 46 coaxially surrounding the cylindrical side wall portion 32 of the hub member 28 and having a rear end located immediately in front of the spoke portions 27b of the steering wheel 27. The slider support member 44 further has a suitable number of hollow socket portions 47 which are formed on the outer peripheral surface of the rear wall portion 46 and which are disposed at suitable spacings from each other circumferentially of the end wall portion 46.

Figure 4:
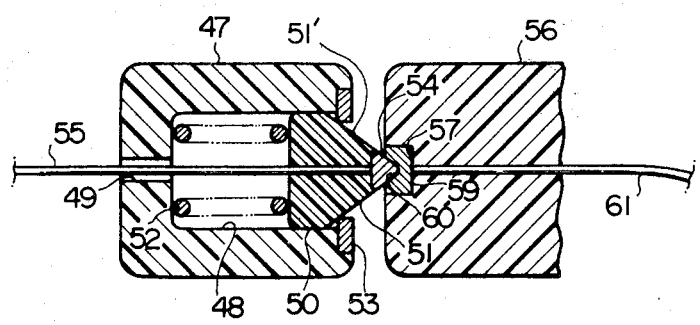
FIG. 4 is a fragmentary sectional view taken, to an enlarged scale, on a plane indicated by arrowheads IV in FIG. 2.
Figure 5:
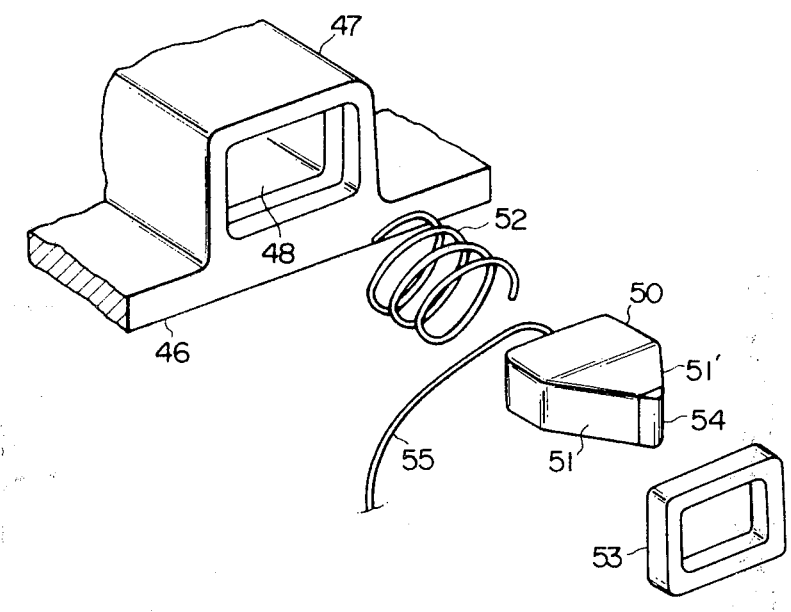
FIG. 5 is an exploded perspective view showing part of the embodiment of the instrument panel supporting structure according to the present invention as illustrated in FIG. 2.

Each of the above mentioned socket portions 47 has a cavity 48 which is elongated in parallel with the center axis of the steering shaft 23 (FIG. 2) and which has a generally rectangular cross section on a plane perpendicular to the center axis of the steering shaft 23 as will be better seen from FIGS. 4 and 5 of the drawings. Each of the socket portions 47 has a front end wall formed with an aperture 49 (FIG. 4) so that the cavity 48 is open forwardly through the aperture 49 and rearwardly at the rear end of the socket portion 47 toward the switch support member 35 forming part of the accessory switch support structure 34 (FIG. 2).

A slider 50 is partially received in the cavity 48 in each of the socket portions 47 and is longitudinally slidable therein in a direction parallel with the center axis of the steering shaft 23. The slider 50 is tapered rearwardly and has a pair of side faces 51 and 51' slanting toward each other with respect to a plane which passes through the center axis of the steering shaft 23. As will be best seen in FIG. 5. The slider 50 thus configured is urged to protrude rearwardly from the cavity 48 in each of the socket portions 47 by suitable biasing means such as a preloaded helical compression spring 52 which is provided in the cavity 48 and which is seated between the slider 50 and the inner face of the apertured front end wall of the socket portion 47. In order to prevent the slider 50 from being dislodged from the cavity 48, a hollow, generally rectangular retainer element 53 is securely attached to the rear end of the socket portion 47, permitting the slider 50 to rearwardly protrude a predetermined distance beyond the retainer element 53 by the force of the spring 52 as will be best seen from FIG. 4. Each of the sliders 50 is constructed of an electrically insulating material such as a synthetic resin.

The sliders 50 thus respectively disposed in the individual socket portions 47 of the slider support member 44 are categorized into two different groups which consist of a first group of sliders 50 each of which has a tapered rear end portion constituted by an electric contact element 54 and a second group of sliders 50 each of which is devoid of such a contact element 54. Of the two sliders 50 which are seen in FIG. 2, the slider 50 illustrated on an upper part of the drawing is assumed to be one of the first group of sliders 50 and the slider 50 illustrated on a lower part of the drawing is assumed to be one of the second group of sliders 50. The slider 50 shown in each of FIGS. 4 and 5 is assumed to be one of the first group of sliders 50 each having the contact element 54 at the rear end thereof.

An electric wire harness 55 is connected at one end thereof to the contact element 54 of each of the first group of sliders 50 and forwardly extends from the contact element 54 in part through the slider 50 and in part through the aperture 49 in the front end wall of the socket portion 47. Though not illustrated in the drawings, the wire harnesses 55 thus extending respectively from the contact elements 54 of the first group of sliders 50 are connected at the other ends thereof to the electric circuits of various electrically operated vehicular instruments such as, for example, a switch for actuating an electric warning horn, a switch for actuating a motor-driven windshield wiper, a drive computer, and so forth.

On the other hand, the switch support member 35 forming part of the previously described accessory switch support structure 34 has an annular projection 56 having a front end face located immediately at the rear of the spoke portions 27b of the steering wheel 27. The annular projection 56 of the switch support member 35 is formed with recesses which are categorized into two groups which consist of a first group of recesses 57 (FIG. 4) and a second group of recesses 58 (FIG. 2). The first and second groups of recesses 57 and 58 thus formed in the annular projection 56 are located to be aligned with the first and second groups of sliders 50, respectively, on the slider support member 44 when the accessory switch support structure 34 assumes a predetermined angular position with respect to the stationary slider support member 44 about the center axis of the steering shaft 23. In each of the first group of recesses 57 is securely fitted an electric contact element 59 formed with a recess 60 which is so shaped as to be adapted to have closely received therein the contact element 54 of each of the first group of sliders 50. On the other hand, each of the second group of recesses 58 is so shaped as to be adapted to have closely received therein a tapered rear end portion of each of the second group of sliders 50. When the accessory switch support structure 34 assumes the above mentioned predetermined angular position with respect to the stationary slider support member 44, the individual sliders 50 on the slider support member 44 are forced to respectively project into the recesses 58 in the annular projection 56 and the recesses 60 in the contact element 59 and have their respective rear end portions closely received in the recesses 58 and 60 by the forces of the compression springs 52. At least one slider 50 being thus received in the recess 58 or 60, the accessory switch support structure 34 prevents from rotation with respect to the slider support member 44 when a driver's turning effort is applied to the steering wheel 27. As a consequence, the switch support member 35 is constrained to stay in the particular angular position with respect to the stationary slider support member 44. Thus, the accessory switch support structure 36 as a whole and the accessory switch assembly 40 on the switch support member 35 are maintained in predetermined angular positions about the center axis of the steering shaft 23 with respect to the slider support member 44 and accordingly to the steering column tube 22. When the sliders 50 are held in positions having their respective rear end portions closely received in the recesses 58 and 60, respectively, as above discussed, the slanting side faces 51 and 51' of each of the sliders 50 intervene between the front end face of the switch support member 35 and the rear end of the slider support member 44 as will be best seen from FIG. 4.

Furthermore, the contact elements 54 of the first group of sliders 50 are respectively received in the recesses 60 in the contact elements 59 embedded in th switch support member 35 and are thus electrically connected to the contact elements 59, respectively. An electric wire harness 61 is connected at one end thereof to each of the contact elements 59 in the switch support member 35 and rearwardly extends from the contact element 59 partly through the switch support member 35 and from the switch member 35 to the switch assembly 40. Though not shown in the drawings, the switch assembly 40 has incorporated therein a plurality of switch units respectively connected to the pushbuttons 43. The individual wire harnesses 61 connected to the contact elements 59 in the switch support member 35 are respectively connected at the other ends thereof to these switch units of the accessory switch assembly 40.

The spoke portions 27b of the steering wheel 27 intervene between the rear end of the cylindrical rear wall portion 46 of the slider support member 44 and the front end face of the annular projection 56 of the switch support member 35. The steering wheel 27 is thus rotatable about the center axis of the steering shaft 23 with respect to both of the switch support member 35 and the slider support member 44. When the steering wheel 27 is turned with respect to the steering column tube 22 and accordingly to the slider support member 44, each of the two spoke portions 27b of the steering wheel 27 will be brought into abutting engagement with any one of the sliders 50 projecting into the recesses 58 and 60. In this instance, the spoke portion 27b is brought into sliding contact with one of the slanting side faces 51 and 51' of the particular slider 50 and forces the slider 50 to retract forwardly away from the annular projection 56 of the switch support member 35 against the force of the spring 52. As the steering wheel 27 is turned, the slider 50 contacted by the spoke portion 27b of the steering wheel 27 is caused to withdraw into the cavity 48 in the socket portion 47 and permits the spoke portion 27b to pass between the slider 50 and the annular projection 56 of the switch support member 35. Each of the spoke portions 27b is provided with an electrically insulating layer 62 on its portion to be contacted by the sliders 50 so that the electrical connection between the contact element 54 of the slider 50 and the contact element 59 in the switch support member 35 is interrupted when the spoke portion 27b of the steering wheel 27 is being passed between the contact elements 54 and 59 if the slider 50 happens to be one of the previously mentioned first group sliders 50.

Each of the switch units forming part of the accessory switch assembly 40 is connected to each of the electric circuits of the electrically operated vehicular instruments through two of the conduction paths each constituted by one of the wire harnesses 61, one of the contact elements 59, one of the contact elements 50 and one of the wire harnesses 55. The hollow socket portions 47 and the sliders respectively received therein being circumferentially disposed at suitable spacings as described above, one of the contact elements 54 on the sliders 50 is held in contact with the counter contact element 59 if one of the spoke portions 27b causes another slider 50 with the contact element 54 to retract away from the annular projection 56 of the switch support number 35. The above mentioned two contact elements 54 and the counter contact elements 59 form parts of two of the conduction paths, respectively. If, thus, the electrical connection between the contact elements 54 and 59 forming part of one of such two conduction paths is interrupted as above described and as a consequence the particular conduction path is cut off, the switch unit to which the two conduction paths are allocated is connected to the electric circuit of the associated vehicular instrument through the other of the conduction paths. In this manner, each of the switch units in the accessory switch assembly 40 is at all times connected to the electric circuit of its associated vehicular instrument through at least one of the two conduction paths allocated to the particular switch unit and the vehicular instrument. On the other hand, the steering wheel 27 is permitted to turn with respect to the steering column tube 22 and the slider support member 44 without causing the switch support member 35 to turn with respect to the slider support member 44 and accordingly the steering column tube 22.

If desired, each of the switch units incorporated in the accessory switch assembly 40 may be connected to the electric circuit of its associated vehicular instrument through three or more conduction paths. The number of the conduction paths between the switch units and the instruments may be reduced if time-division multiplexing signals are put to use for the control of the instruments.

Figure 6:
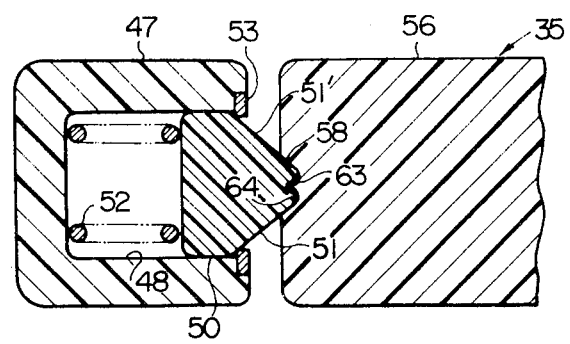
FIG. 6 is a sectional view similar to FIG. 4 but shows a modification of the arrangement illustrated in FIG. 4.

FIG. 6 of the drawings shows a modification of the arrangement providing the engagement between the switch support member 35 and each of the sliders 50. In the arrangement herein shown, each of the sliders 50 has a recess 63 formed in its tapered rear end portion and the annular projection 56 of the switch support member 35 has a protrusion 64 located in each of the recesses 58 therein. The protrusion 64 of the annular projection 56 projects and is received in the recess 63 in the slider 50 so that firmer engagement is achieved between the slider 50 and the switch support member 35.

It will be apparent that the essential subject matter of the present invention may be applied to an instrument panel supporting structure having an inflatable safety bag stowed in a housing carried on the steering wheel. In this instance, the steering wheel may have carried thereon only the safety bag or both of the safety bag and the switch assembly.

What is claimed is:

1. An instrument panel supporting structure for a steerable vehicle including a body structure having a fore-and-aft direction, comprising:
   a hollow steering column tube held stationary with respect to said body structure,
   a steering shaft axially extending in and through said steering column tube and having a rear end portion, the steering shaft having a center axis therethrough and being rotatable about the center axis with respect to the steering column tube,
   a steering wheel rotatable with the steering shaft about said center axis and including at least one spoke portion extending substantially radially away from said center axis,
   a first support member mounted on the rear end portion of the steering shaft and rotatable about said center axis with respect to both the steering column tube and the steering shaft,
   a second support member fixed with respect to said steering column tube, one of the first and second support members having a plurality of recesses arranged circumferentially about said center axis and open in directions parallel with said center axis and the other of said first and second support members being formed with a plurality of cavities arranged circumferentially about said center axis and open toward and in alignment with said recesses, respectively, said spoke portion partly intervening between said first support member and said second support member so as to intervene between any one of said recesses and correspondingly aligned cavities when the steering wheel assumes a predetermined angular position about said center axis with respect to said steering column tube, a plurality of slidable members respectively movable through said cavities toward and away from said recesses, each of said slidable members having a tapered end portion so as to be moved by said spoke portion, and biasing means urging each of said slidable members to project into each of said recesses so as to have the tapered end portion of each slidable member received in each of the recesses, said slidable members comprising a first group of members each having a tapered end portion provided with an electric contact element and a second group of members each of which is devoid of an electric contact element, said recesses comprising a first group of recesses each having an electric contact element embedded therein and formed with a recess provided with a contact element for receiving and contacting each of said first group of slidable members and a second group of recesses each of which is devoid of an electric contact element, each of the contact elements of said first group of slidable members being urged by said biasing means to establish electrical connection with each of the contact elements in said first group of recesses.

2. An instrument panel supporting structure as set forth in claim 1, wherein said first support member has mounted thereon a switch assembly including a plurality of switch units for controlling electrically-operated vehicular instruments, the contact elements in said first group of recesses being electrically connected to said switch units and the contact elements of said first group of slidable members being electrically connected to said vehicular instruments.

3. An instrument panel supporting structure as set forth in claim 2, wherein each of said switch units is electrically connected to each of said vehicular instruments through at least two conductive means, each of which is constituted in part by one of the contact elements in said first group of recesses and one of the contact elements of said first group of slidable members.

4. An instrument panel supporting structure as set forth in any one of claims 1 to 3, wherein each of said slidable members has a recess formed in the tapered end portion thereof and wherein one of said first and second support members is formed with a protrusion located in each of said recesses therein, said protrusion being received in the recess in each of said slidable members.

5. An instrument panel supporting structure as set forth in any one of claims 1 to 3, wherein said spoke portion has an electrically insulating layer provided on the portion thereof to be contacted by said slidable members.

6. An instrument panel supporting structure as set forth in any one of claims 1 to 3, further comprising retainer elements which are fitted to said second support member and each of which is engageable with each of said slidable members for preventing each said slidable member from being dislodged from the second support member.

* * * * *